Jan. 29, 1952   W. J. HILL ET AL   2,583,844
VERTICAL BAR AND BILLET MILL
Filed Dec. 8, 1950   10 Sheets-Sheet 10
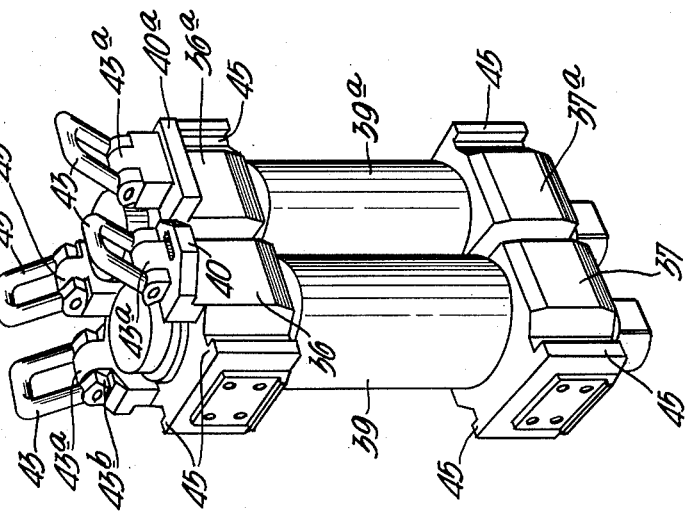
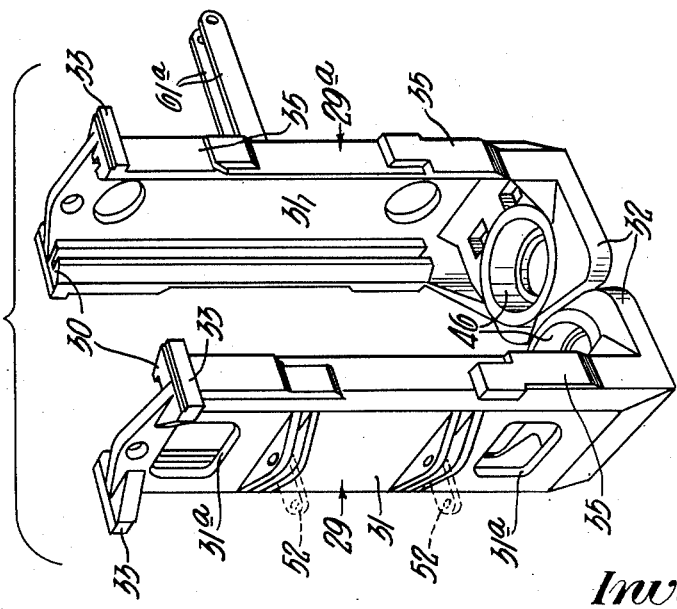
*Inventors:*
WILLIAM J. HILL and
CHARLES C. WALES,
by: Donald G. Dalton
*their Attorney.*

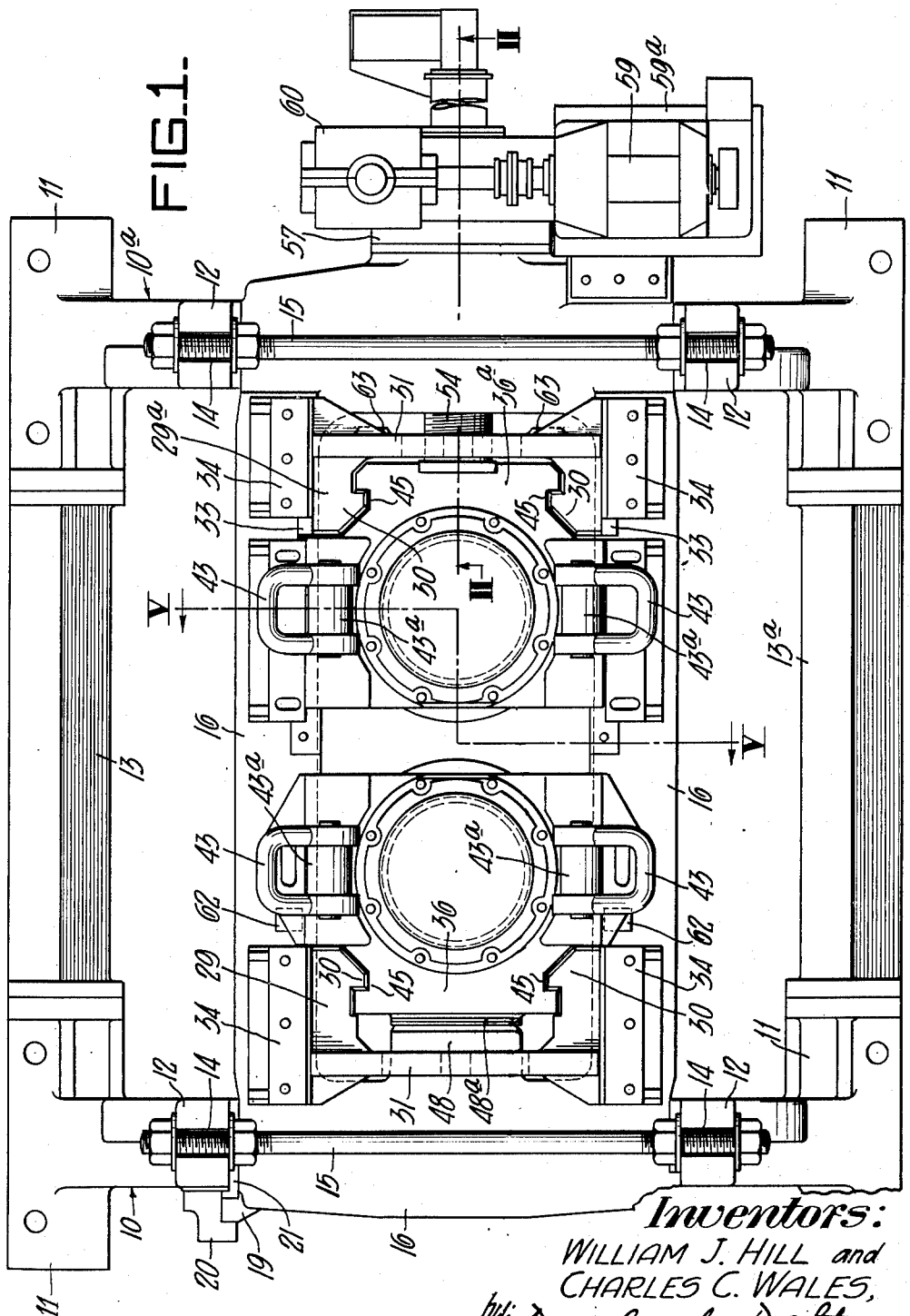

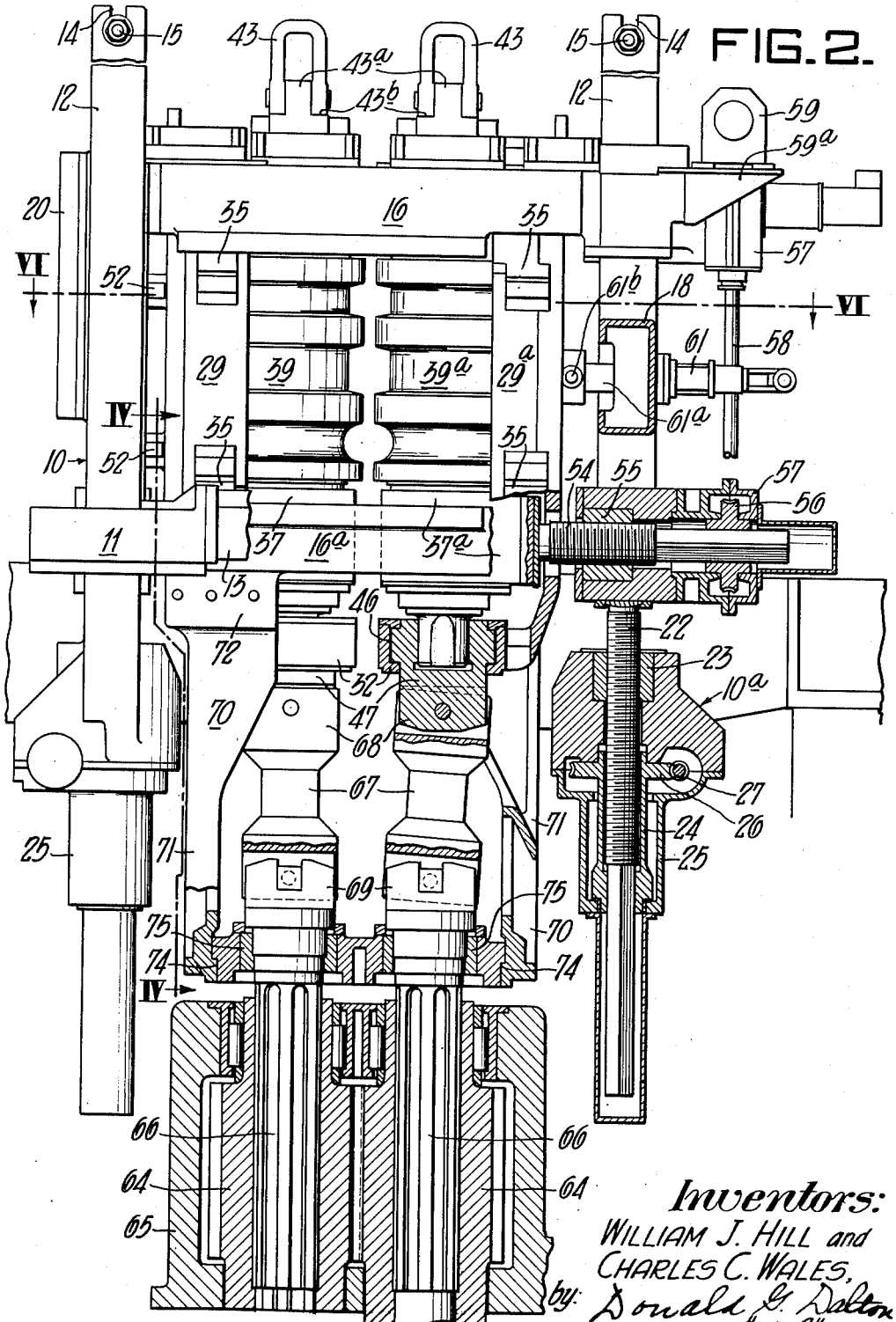

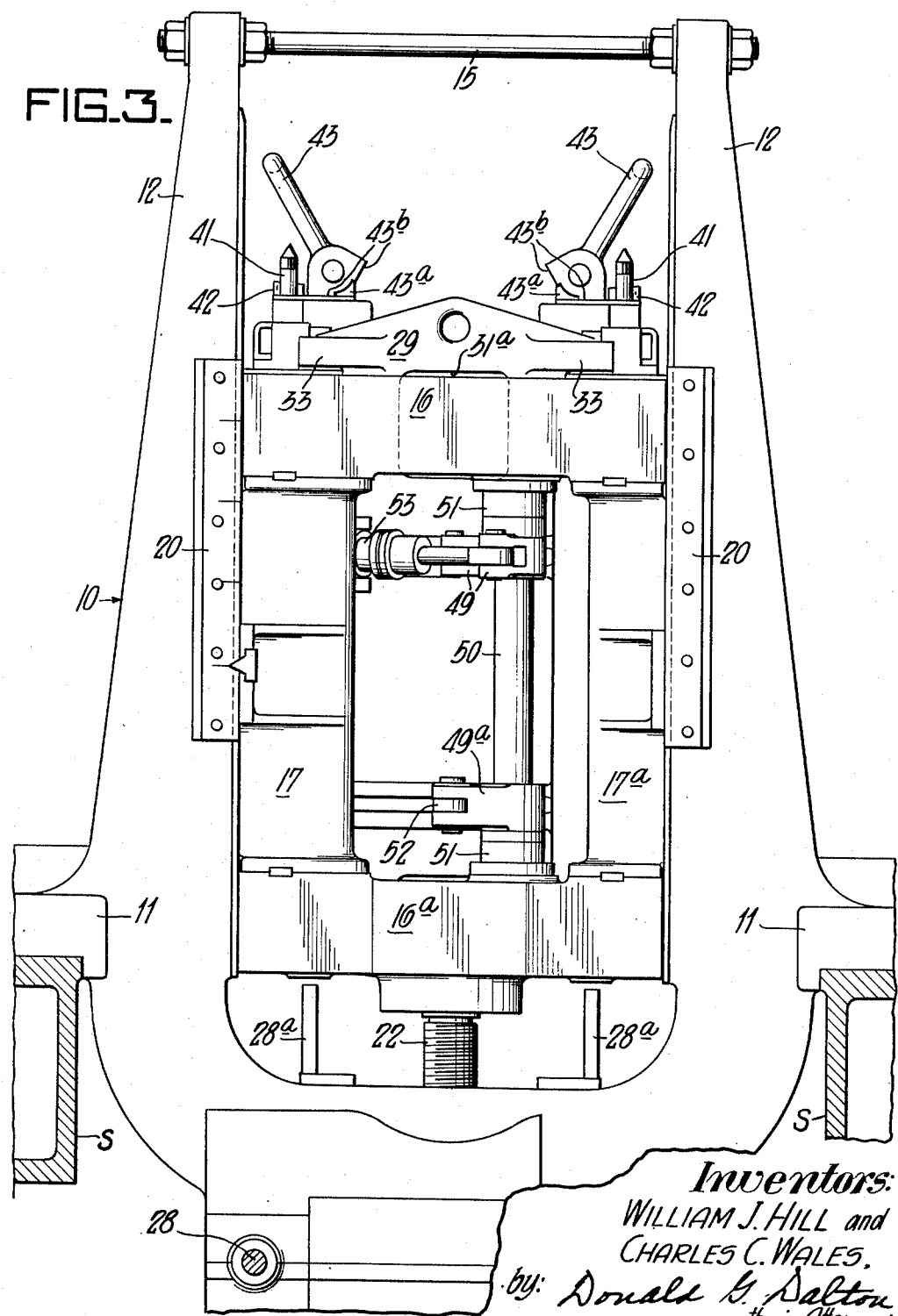

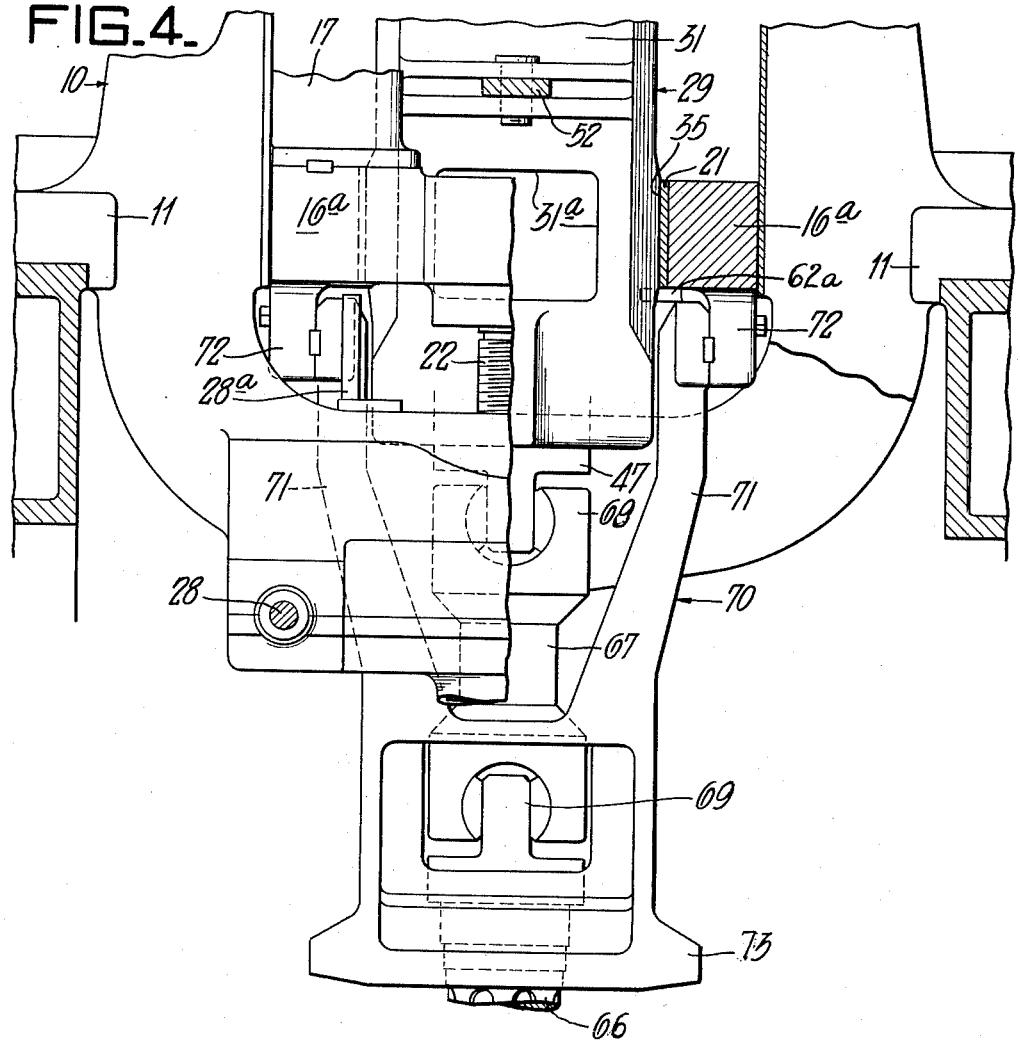

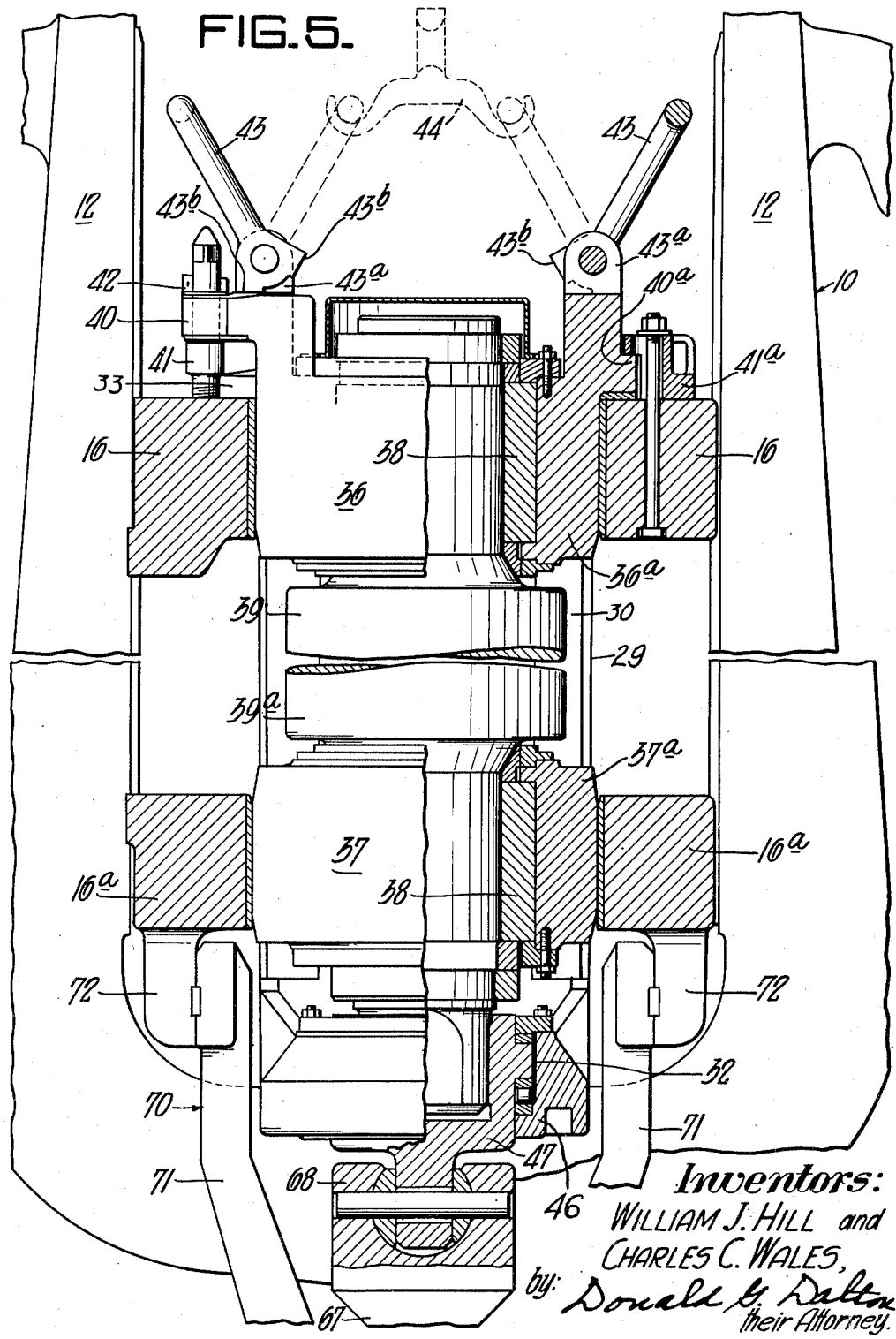

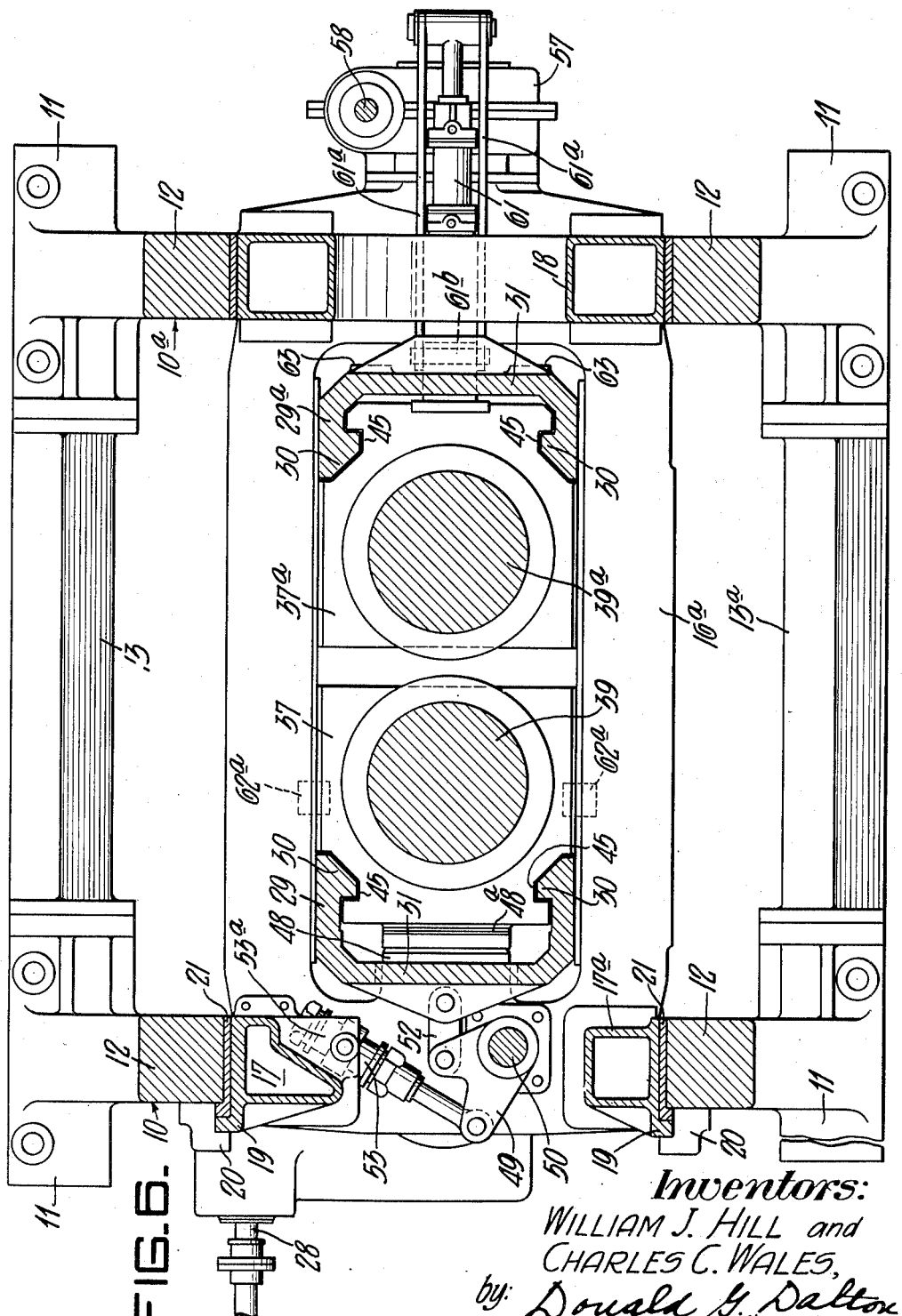

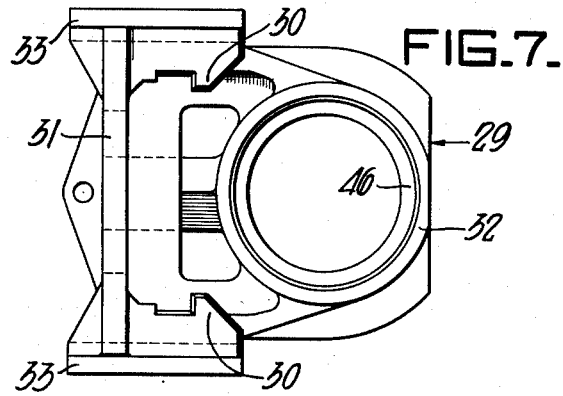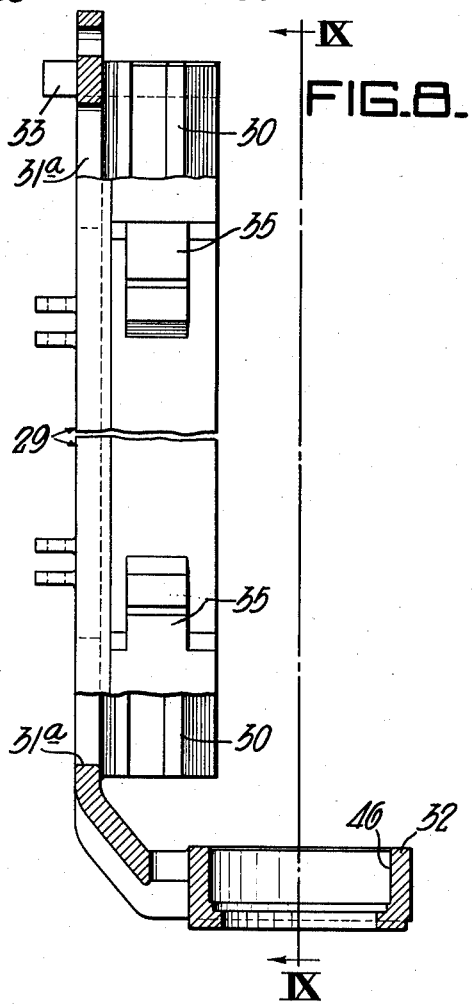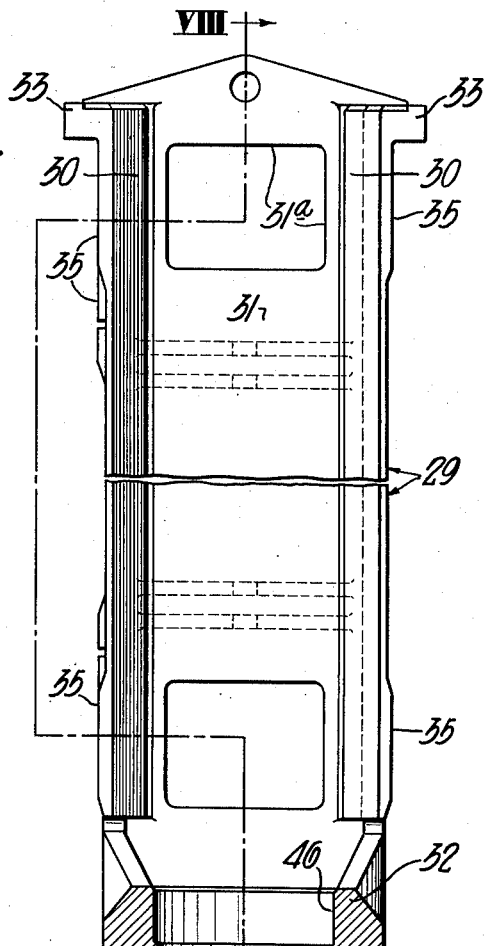

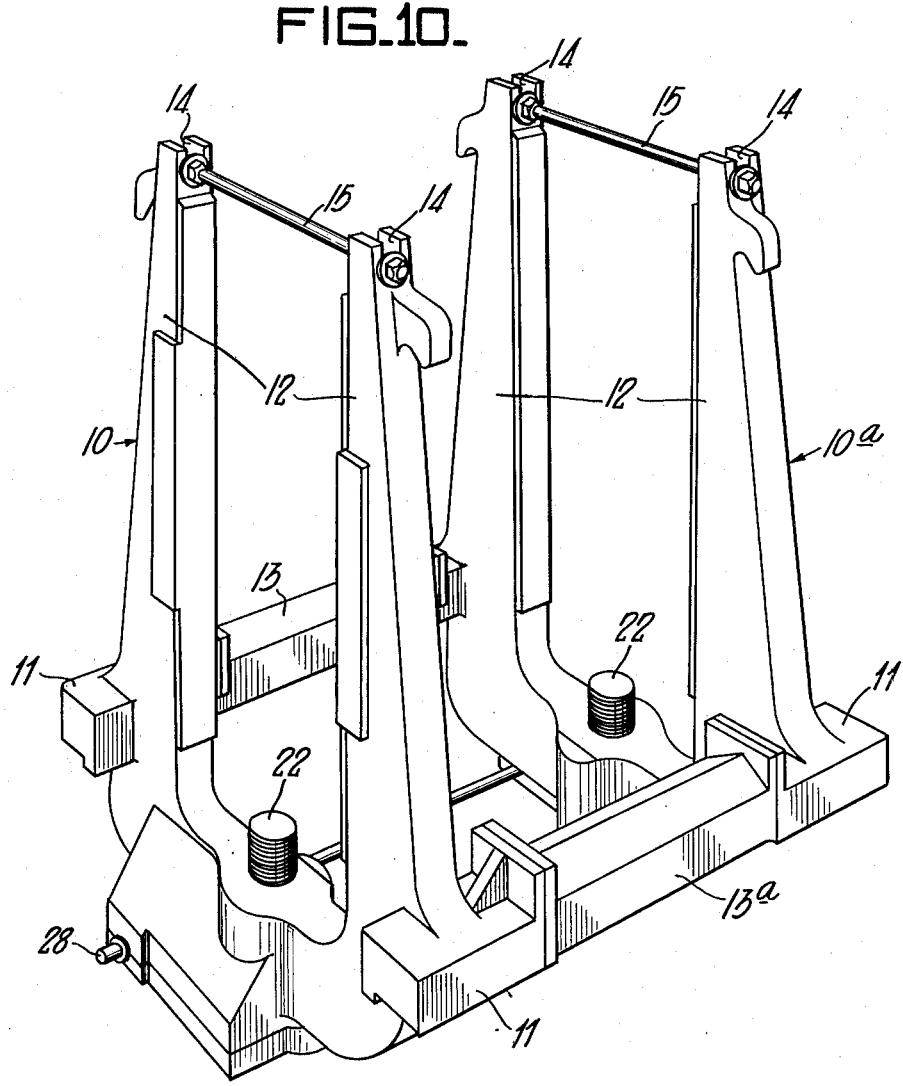

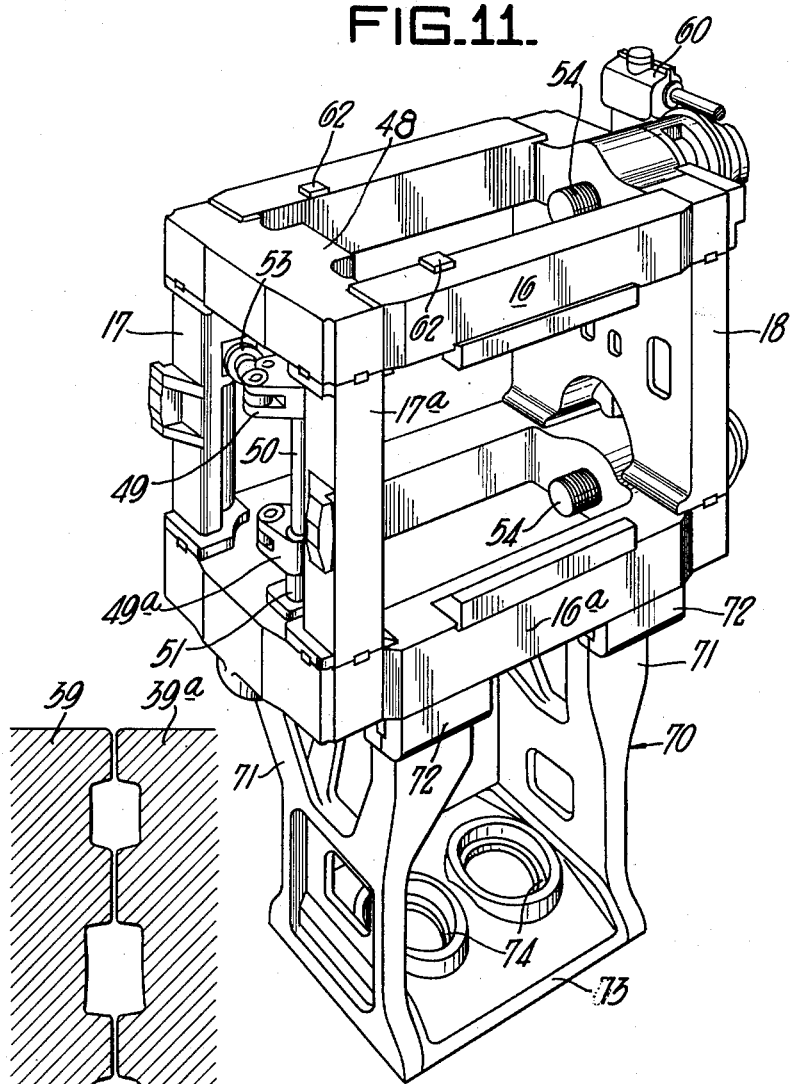

Patented Jan. 29, 1952

2,583,844

UNITED STATES PATENT OFFICE 2,583,844

VERTICAL BAR AND BILLET MILL

William J. Hill, Mount Lebanon, Pa., and Charles Clarke Wales, Lorain, Ohio, assignors to United States Steel Company, a corporation of New Jersey Application December 8, 1950, Serial No. 199,892

15 Claims. (Cl. 80—31.1)

This invention relates to a vertical rolling mill adapted to be installed in train alternately with horizontal mills for the production of billets and bars of various shapes and sizes at high speed.

One of the important factors affecting the cost of rolling-mill products such as steel bars or billets is the idle or "down" time of the mill, i.e., the total time during the turn, day or month in which the mill is shut down for maintenance, repair or roll-changing, and is consequently unproductive, while the labor and capital charges continue. This is particularly true of modern mills designed for a high production rate, which are very costly to build. Shut-downs for maintenance and repair can be kept to a minimum by careful design of the mill but frequent roll changes have heretofore been necessary in order to produce the variety of shapes and sizes required to supply a wide range of products. Vertical roll stands alternating with horizontal stands are necessary in a continuous, straight-line mill in order to avoid twist guides which are not feasible for the larger sizes of stock and impair the quality of the product. The limit on the size of stock which can be twisted 90° between the stands of a mill composed exclusively by horizontal stands restricts the tonnage it is possible to produce on a given mill. This results from the fact that practical considerations limit the width of and therefore the number of passes which can be provided in the reversing blooming mill which converts ingots into blooms for further reduction to billets or bars in the continuous mill. Thus the smaller the blooms required for the continuous mill, the smaller the maximum size of ingot for which the blooming mill passes may be designed. The maximum ingot size limits the capacity of the blooming mill.

Continuous bar mills incuding alternating horizontal and vertical stands, as used heretofore, furthermore, in some cases had only one pass in the vertical rolls, necessitating a change of rolls in order to change sizes. This made it necessary to shut down the mill as much as eight hours for the roll changes required to produce a product of a different size from that previously rolled. It also necessitated a shut-down of the blooming mill (unless a duplicate billet mill were provided) or operation of the blooming mill at a reduced rate to turn out blooms much smaller than ordinarily produced. Thus, while a mill including vertical as well as horizontal stands is recognized as producing a product superior to that of the mill composed of horizontal stands exclusively, the latter has been favored nevertheless because of the delay and obstruction to the blooming mill involved in a change of rolls of the vertical mills used heretofore, in order to produce a different size bar. It is accordingly an object of our invention to provide a vertical mill of such construction that a roll change may be completed in a few minutes. A further object is to achieve a great flexibility in the range of product as to size and shape and to permit the rolling of square, rectangular and round stock of different sizes without changing rolls. A further object is to provide a relatively simple design of mill so that it may be quickly and easily assembled and taken apart when repairs are necessary. In particular, our object is to provide not merely an edging mill but a vertical mill capable of making drafts equal to those made by the horizontal roll stands. These objects we attain by a novel arrangement of standardized features of mill construction in combination with new elements, as will be made clear hereinafter.

In a preferred embodiment, our mill comprises a pair of spaced, upstanding, open-topped, outboard housings and a pair of vertically spaced inboard housings such as are ordinarily used for horizontal mills, disposed horizontally and extending into the windows thereof. The windows of the inboard housings accommodate the chocks of a pair of multiple-pass vertical rolls, one fixed and the other adjustable laterally toward and from it. Spaced vertical guide frames are hung on the upper inboard housing and extend downwardly through the window thereof and into the window of the lower housing. They are provided with ways adapted to cooperate with each of the independent upper and lower chocks of both rolls, and facilitate their entry into and removal from the housings. The guide frames have horizontal portions or shelves at their lower ends with seats bored therein to receive and support the driving pods which engage the lower or wobbler ends of the rolls. A yoke suspended from the lower inboard housing has bearing seats formed therein to suspend vertically movable, splined spindles which telescope through the hollow meshing drive pinions of a fixed, vertical, pinion stand located below the mill proper, when the inboard housings are raised or lowered. These splined spindles are connected to the roll-driving pods by intermediate drive spindles having universal joints at both ends, the pods forming a part of the joints at the upper ends and the splined spindles forming a part of the joints at the lower ends.

The outboard housings have vertical jack screws for raising or lowering the inboard housings and roll chocks as a unit to select the desired pass in the vertical rolls. The inboard housings are of the closed-top type and have screws at one end for effecting adjustment of the pass width by shifting the adjustable roll laterally. Roll-positioning abutments are located at the other end against which chocks of the fixed roll are held. Jack screws on the upper housing adjustably support the fixed roll to secure proper cooperative relation of the pass-forming grooves in the two rolls. A hydraulic pull-back device for each roll is connected to the guide frame in which the pair of chocks for each roll are carried. We also provide a pair of lifting bails on the upper chock of each roll and a hook adapted to engage all four bails at once so that both rolls may be lifted out together by a crane when the pass-opening adjusting screws of the inboard housings have been backed off and other necessary preliminary adjustments made as will be explained in detail later.

A complete understanding of the invention may be obtained from the following detailed description and explanation which refer to the accompanying drawings illustrating a present preferred embodiment. In the drawings, Figure 1 is a plan view of our mill;

Figure 2 is a side elevation with a portion in section along the plane of line II—II of Figure 1;

Figure 3 is an end elevation such as would be seen looking from the left in Figure 2;

Figure 4 is a partial end elevation similar to Figure 3 with a portion in section along the plane of line IV—IV of Figure 2;

Figure 5 is a vertical section through the horizontal inboard housings taken along the plane of line V—V of Figure 1;

Figure 6 is a horizontal section taken along the plane of line VI—VI of Figure 2;

Figure 7 is a plan view of one of the guide frames;

Figure 8 is a side elevation thereof with parts in section along the plane of line VIII—VIII of Figure 9;

Figure 9 is a front elevation thereof with a portion in section along the plane IX—IX of Figure 7;

Figure 10 is a perspective view of the outboard housings;

Figure 11 is a similar view of the inboard housings and bearing carrier yoke;

Figure 12 is a similar view of the roll-chock guide frames;

Figure 13 is a similar view of the rolls and their bearing chocks, the rolls being shown as plain-surfaced for convenience, instead of grooved as they actually are;

Figure 14 is a partial section through the rolls of the next-to-the-last stand of a multi-stand continuous mill, showing the variety of shapes and sizes of passes which can be obtained; and Figure 15 is a perspective view of the hook for engaging the bails on the upper roll chocks.

Referring now in detail to the drawings, a pair of spaced open-topped outboard housings 10 and 10a have feet 11 adapted to rest on the usual shoes S (Figure 3) and spaced upstanding posts 12. Spacer castings 13 and 13a (Figures 1 and 6) extend between the inner ends of feet 11 on the two sides of the housings, respectively. The upper ends of the posts 12 are slotted as at 14 to accommodate tie-rods 15. Vertically spaced inboard housings 16 and 16a are disposed horizontally with their ends between the posts 12 of housings 10 and 10a. The housings 16 and 16a are held in spaced relation at one end by spacer castings 17 and 17a (Figure 3) and at the other by a single box-section casting 18 (Figures 2 and 6) arched at the top and bottom. Castings 17 and 17a have laterally extending tongues 19 (Figures 1, 3 and 6) cooperating with cheek plates 20 secured to the outer faces of the posts of housing 10. These tongues and plates confine the horizontal housings against longitudinal movement. They are confined against lateral movement by liner plates 21 attached to the opposed faces of the posts 12.

The housings 16 and 16a are adjustable vertically as a unit in housings 10 and 10a by means of vertical screws 22 (Figures 2–4) journaled in the bottom of housings 10 and 10a. As shown in Figure 2, the screws are threaded through nuts 23 seated in recesses formed in the housings and are driven by quills 24 journaled in chambers 25 depending therefrom. The lower ends of the screws are squared and the lower ends of the quills are shaped to fit them snugly while permitting relative vertical sliding movement. The quills have worm wheels 26 adjacent their upper ends driven by worms 27. The shafts on which these worms are mounted are driven simultantously through a cross shaft 28 (Figures 4 and 6) and bevel gearing, not shown. Stops 28a (Figure 3) extending upwardly from the bottoms of housings 10 and 10a limit the downward movement of housings 16 and 16a.

Roll-chock guide frames 29 and 29a (Figures 1, 2, 6–9 and 12) are disposed vertically in the windows of housings 16 and 16a. These guide frames, as shown in detail in Figures 7 through 9 and 12 have spaced opposed vertical ways 30, a web 31 connecting them and a shelf 32 extending horizontally from the lower end of the web. This shelf is bored to provide a bearing seat for a purpose which will appear later. At their upper ends the guide frames have laterally projecting ledges 33 (Figures 3, 7, 9 and 12) resting on the upper face of housing 16. The guide frames are confined against vertical movement by cheek plates 34 (Figures 1 and 3) but are free for horizontal movement in the windows of housings 16 and 16a. The guide frames have pads 35 (Figures 2 and 8) closely fitting liner plates on the opposed surfaces of the housing windows (Figure 4).

Roll chocks 36 and 36a are disposed in the windows of upper housing 16 and chocks 37 and 37a in the window of housing 16a, in alinement therewith (Figure 5). The chocks have conventional thrust and radial bearings 38 therein (indicated in the drawings by a solid ring or sleeve) which receive the necks of a pair of vertical rolls 39 and 39a having cooperating pass-defining grooves spaced therealong. The chocks 36 and 36a are generally similar except that the former have laterally extending ledges 40 (Figures 3 and 5) which rest on enlargements intermediate the ends of jack screws 41 threaded into tapped holes in the upper face of housing 16, the ledges being slotted to receive the screws. The screws 41 permit the adjustment of the roll 39 vertically relative to roll 39a, and have slots therethrough above the ledges 40 to accommodate securing keys 42 which resist upward thrust of the rolls. The chock 36a has ledges 40a (Figure 5) secured in place by cheek plates 41a bolted to housing 16.

Chocks 37 and 37a hang in the window of housing 16a, being suspended by the rolls themselves, and confined between liner plates secured in the windows. Similar liner plates in housing 16 confine chocks 36 and 36a. The latter have bails 43 (Figures 1-3 and 5) pivoted to lugs 43a upstanding thereon. The bails have angularly disposed heels 43b (Figures 3 and 5) adjacent their pivots to limit their inward and outward tilting movement. The bails are normally tilted outwardly when the mill is in operation to allow a hook 44 (Figures 5 and 11) to be lowered between each pair for engagement thereby when it is desired to remove the rolls.

The outer sides of roll chocks 36, 36a, 37 and 37a have T-shaped grooves 45 (Figures 1 and 6) to cooperate with ways 30 of guide frames 29 and 29a. The ways thereby serve to guide both the upper and lower chocks into proper position in the windows of housings 16 and 16a when the rolls are being lowered into place. The shelves 32 of the guide frames, furthermore, have seats 46 (Figures 2 and 5) formed therein to accommodate thrust bearings for the roll-driving pods 47. The pods are shaped to receive the wobbler ends of the rolls, i. e., the driving extensions below the lower chocks. Seats 46 have thrust bearings 46a therein on which the pods turn. The pods have "fish tails" 47a depending therefrom for cooperation with the driving spindles and forming one element of the universal joint at the upper end of each spindle, which will be described in detail later. For the present, it is sufficient to note that the bearing seats 46 hold the pods 47 in accurate alinement with the axes of the rolls when the latter are being lowered by reason of the guiding action of the ways 30 of the guide frames on the outer sides of the chocks and insure positive engagement between the wobbler ends of the rolls and the driving pods.

Referring now more particularly to Figure 6, the chocks 36 and 37 of roll 39 are positioned by abutments 48 extending inwardly from one end of the windows of housings 16 and 16a. The webs 31 of the guide frames have openings 31a formed therein to admit the abutments 48. Removable shim blocks 48a are disposed between the abutments and the chocks and are attached to the latter, for the purpose of adjustment to compensate for roll turn-down. Guide frame 29 is pulled outwardly to force the chocks 36 and 37 squarely and firmly against the abutments, by a bell crank 49 and a crank 49a keyed to a vertical shaft 50 journaled in bearings 51 secured to the adjacent faces of the housings 16 and 16a at one end thereof (Figures 3 and 6). Crank 49a and one lever arm of bell crank 49 are connected to guide frame 29 at vertically spaced points by links 52 pivoted thereto. The other arm of the bell crank 49 is pivoted to the piston rod of a double-acting fluid-pressure motor 53 pivoted between ears 53a extending inwardly from spacer casting 17 which is shaped to provide a cavity for accommodating the latter. By virtue of the construction described, the admission of power fluid under pressure to the cylinder of motor 53 causes the shaft to turn through a small angle in one direction or the other, depending on the direction of fluid pressure in the motor cylinder. With proper application of pressure, the motor causes an outward pull on links 52. Since there are two sets of links 52 vertically spaced, the ways 30 of guide frame 29 are held precisely vertical as the frame moves. The outward pull on the frame is transmitted to the chocks 36 and 37 by the engagement of ways 30 with the outer sides 45 of the chocks.

Roll 39a is adjusted toward and from roll 39 by a pair of screws 54 (Figures 1 and 2) extending through the ends of housings 16 and 16a opposite those which the abutments 48 are located and disposed coaxially thereof. Screws 54 are threaded through nuts 55 seated in recesses formed in the housings. The outer ends of the screws are squared to cooperate with square holes through worm wheels 56 journaled in gear boxes 57 which are secured to the ends of housings 16 and 16a. A vertical shaft 58 driven by a motor 59 through bevel gearing enclosed in a gear box 60 has worms thereon meshing with worm wheels 56. Motor 59 is mounted on a bracket 59a secured to housing 16. A duplicate pair of screws 54 may, of course, be provided for the chocks of roll 39, in lieu of fixed abutments 48, if desired.

Chocks 36a and 37a are held against the inner ends of screws 54 by linkage to a fluid-pressure motor 61 (Figures 2 and 6) mounted on spacer casting 18 and extending outwardly therefrom. Links 61a are pinned to the outer end of the piston rod of motor 61 and to an eye 61b formed on guide frame 29a. The casting 18 is provided with openings to admit links 61a. Power fluid under pressure is supplied continuously to the cylinder of motor 61 thus pulling the links and guide frame 29a outwardly, thereby retracting chocks 36a and 37a against the screws 54. The guide frame 29a has openings therein to accommodate the screws. The outward pull exerted on the guide frame by the fluid-pressure motor is such that the top and bottom chocks will always follow the screws as they retract or advance exerting pressure against them of sufficient force to preload the screws so as to take up all backlash between components, thus assuring a "rigid mill." Since the screws are both driven by a common worm shaft, they advance or retract equally, thus the guide frame, by holding the chocks against the screws, always assures a true vertical position of the ways 30.

For roll-changing, motor 53 is operated in reverse to move guide frame 29 inwardly. Housing 16 has stops 62 on the upper face thereof and housing 16a has stops 62a on the lower face thereof effective to arrest the inward movement of guide frame 29. The latter is thus rigidly fixed in position and held precisely plumb to guide the roll chocks accurately out of and into the housing windows. Guide frame 29a has stop pads 63 on the outer face thereof adapted to engage the screw ends of housings 16 and 16a to limit the range of retraction of the frame under the constantly exerted force of motor 61.

The rolls 39 and 39a are driven by meshing hollow pinions 64 (Figure 2) journaled in a case 65 and driven by any convenient means, such as a horizontal or angularly disposed spindle and bevel gears (not shown). A splined spindle 66 extends through the bore of each pinion 64 which is slotted to cooperate with the splines of the spindle whereby the latter may slide vertically or telescope through the pinion. An intermediate spindle 67 extends from each splined spindle 66 to one of the pods 47, and is provided with universal joints 68 and 69 permitting lateral adjustment of one roll relative to the other while the centers of driving pinions 64 and telescopic spindles remain fixed.

The weight of the splined spindles 66, intermediate spindles 67 and their universal joints is carried by a bearing yoke 70 depending from lower horizontal casting 16a as best shown in Figures 2 and 11. The yoke 70 is composed of depending struts or hangers 71 keyed to lugs 72 extending downwardly from housing 16a, and a bottom plate 73 extending between the lower ends of struts 71. The plate 73 has a pair of spaced bearing seats 74 provided with radial and thrust bearings 75 preferably of the self-aligning type, on which the upper ends of spindles 66 are journaled. By this construction, the spindles 66 and 67 and the universal joints of the latter move vertically with the housings 16 and 16a. The pods 47, however, are carried on the guide frames 29 and 29a from the upper housing 16.

When it is desired to replace the rolls 39 and 39a with a different set, the pressure of chocks 36 and 37 against abutments 48 and the pressure of screws 54 against chocks 36a and 37a must be released. To this end, screws 54 are backed off and the fluid pressure normally applied to motor 53 is reversed. Cheek plates 41a are retracted and keys 42 are removed. The reversal of the fluid pressure applied to motor 53 causes guide frame 29 to move inwardly away from abutments 48 against which it normally holds chocks 36 and 37. Inward movement of the guide frame is arrested when it engages stop blocks 62 and 62a. Backing off screws 54 permits motor 61 to retract guide frame 29 until stop pads 63 thereon engage the screw ends of housings 16 and 16a. Both guide frames are thus firmly held in a fixed, predetermined position and precisely vertical so that the rolls and chocks may easily be lifted out and replaced. After the guide frame 29a has come to rest against ends of housings 16 and 16a, the screws continue to back off sufficiently far to allow the ends of the screws to leave the chock breaker blocks, thus affording ample clearance over the ends of the screws for the raising of the roll and chock assembly. The hook 44 is then lowered to the position shown in Figure 5 and bails 43 are tilted inwardly so as to be engaged thereby. The tongues 44a of the hook are spaced so as to receive the bails when the rolls have been positioned for removal as just described. When the hook is lifted, as by a crane, the rolls 39 and 39a and their upper end lower chocks are raised, the chocks being guided by the ways 30 of the guide frames 29 and 29a. The wobbler ends of the rolls are withdrawn from the pods 47 but the latter are held in precisely the proper position for receiving the wobbler ends of the new rolls when lowered into place. The guide frames, of course, remain in place and are therefore adapted to be engaged by the chocks of the new set of rolls, serving to guide them accurately into place in the housing windows, prevent rotation of the lower chock on the roll neck after passing through the window of the upper housing and also to center the wobbler ends of the rolls with the driving pods 47 carried by the seats 46 on the lower ends of the guide frames. Thereafter it is only necessary to restore the cheek plates 41a and keys 42, again reverse the fluid pressure on motor 53 to cause it to pull guide frame 29 outwardly, and advance screws 54 to obtain the desired setting between rolls.

While the guide frames 29 and 29a are particularly advantageous for a vertical mill and have been disclosed in that connection, they are also applicable to a horizontal mill, such as would result if housings 16 and 16a were stood on end. In the horizontal mill, the guide frame would have the same advantage as in a vertical mill, i. e., that of providing guides for insuring the proper positioning of the chocks in housing windows and correct relation of the pods with the wobbler ends of the rolls on placing the latter in the mill, and to form the supporting structure for the upper roll suspension system. A further advantage of the guide frame in a horizontal mill is that they eliminate the need of individual supports for the upper driving spindle. The mill end of the spindles is carried by the bearing in the upper guide frame in which the roll pod is journaled and the spindle and guide frame are supported as a unit by a common lifting mechanism. This holds the mill end of the spindle on the roll centerline concentric for all elevations of the roll.

The flexibility of the mill is indicated in Figure 14, showing a pair of rolls 39 and 39a having grooves therein defining a pair of square passes and a pair of breakdown passes for rounds, the passes of each pair being of different sizes. Thus it is possible to set the mill for rolling one of two sizes of round or square product without changing rolls.

It will be apparent that a mill embodying the features claimed below has numerous advantages in addition to those already mentioned. The entire mill, for example, is so constructed that it may be easily assembled and taken apart as necessary to permit overall repair. The open-topped outboard housing 12 permits the horizontal inboard housings and the rolls to be removed and replaced as a unit, if desired. This operation necessitates only the removal of tie rods 15 whereupon the housings 16 and 16a may be lifted out of the outboard housings 10 and 10a. Guide frames 29 and 29a and bearing carrier yoke 70 are lifted with housings 16 and 16a and spindles 66 and 67 move with the yoke. The assembly of the mill may be effected equally easily. As will be clear from Figures 10 through 13, housings 16 and 16a with yoke 70 attached may be lowered into housings 10 and 10a where tie rods 15 have been removed. Spindles 66 and 67 are then placed in yoke 70. Guide frames 29 and 29a with pods 47 on seats 46 are next placed in housings 16 and 16a and the pods properly related to spindles 67. All is then ready for the reception of the rolls and their chocks.

The bearing seats 46 for the roll driving pods at the lower ends of the chock guide frames 29 and 29a support the upper ends of the angular disposed drive spindles 67 and prevent them from falling in the direction of inclination when the roll wobblers are retracted from the pods, during roll changes. A further advantage is that the entire mill drive may be operated for inspection or other purposes when the rolls are out of the mill. This is an important maintenance feature. Lacking the guide frames 29 and 29a and their bearings seats 46, latches, wedges, stops or the equivalent would be necessary to prevent the spindles from falling over when the rolls are removed and such expedients prevent the turning of the spindles so that the mill drive cannot be operated. Guide frames 29 and 29a, in addition to facilitating roll changes, serve admirably as means for supporting the usual delivery guides (not shown). When so mounted, the guides automatically follow the adjusting movements of the rolls.

The use of approximately standard mill housings in horizontal position and vertically spaced relation to form the supports for the bearing chocks of the vertical rolls, lends simplicity to the construction and reduces the cost thereof. The necessary driving relation between the pinions and the rolls is maintained whatever the vertical and horizontal adjustment of the latter.

The principal advantage of our mill, however, is the short time required to change rolls and the fact that the rolls are provided with several passes so that it is not necessary to change rolls in order to change the size or shape of the product. Actual experience with the mill indicates that from five to eight size changes per eight-hour turn may be required and that each can be completed in less than ten minutes. When it is necessary to change vertical rolls, furthermore, this can be accomplished in less than a half-hour. Our mill thus eliminates the necessity for a duplicate bar mill or for slowing down or stopping the blooming mill or diverting its product during changes of the rolls of the vertical stands.

Although we have disclosed herein the preferred embodiment of our invention, we intend to cover as well any change or modification therein which may be made without departing from the spirit and scope of the invention.

We claim:

1. A rolling mill comprising a pair of spaced, open-topped mill housings standing erect, a pair of mill housings closed at both ends, disposed horizontally, in vertically spaced relation within said first-mentioned housings, said second-mentioned housings forming an assembly slidable vertically as a unit in said first-mentioned housings, windows in all said housings, a pair of vertical guide frames spaced apart horizontally, open at the top, suspended from the upper of said second-mentioned housings and depending through the windows of the latter, roll chocks arranged in vertically alined pairs, one chock of each pair being disposed in the window of each of said second-mentioned housings, vertical rolls journaled in each pair of chocks, said frames guiding vertical movement of said chocks on removal and replacement of the rolls.

2. The apparatus defined by claim 1 characterized by said frames having vertical ways thereon and said chocks having portions fitting said ways for sliding movement therealong.

3. The apparatus defined by claim 1 characterized by said frames having vertical ways thereon and said chocks having portions fitting said ways for sliding movement therealong, said ways being grooves and said chocks having flanges fitting in said grooves.

4. The apparatus defined by claim 1 characterized by said frames being slidable along said second-mentioned housings.

5. The apparatus defined by claim 1 characterized by each of said frames having an inwardly extending shelf, a bearing seat on each shelf, and a driving pod fitting the wobbler end of each of the vertical rolls, said pods being carried on said seats.

6. The apparatus defined by claim 1 characterized by each of said frames having an inwardly extending shelf, a bearing seat on each shelf, and a driving pod fitting the wobbler end of each of the vertical rolls, said pods being carried on said seats, each of said shelves having a vertical opening therethrough coaxial with said seats, said pods extending through said openings and connected to driving spindles below said shelves, whereby the pod bearing seats support the spindles against tilting when the rolls and chocks are removed from the second-mentioned housings.

7. The apparatus defined by claim 1 characterized by said frames having laterally projecting ledges resting on the edges of the window of the upper horizontally disposed housing.

8. The apparatus defined by claim 1 characterized by roll-retracting means connected to said frames effective to hold said chocks against opposed roll-positioning abutments.

9. The apparatus defined by claim 1 characterized by horizontal roll-positioning screws threaded through one end of said second-mentioned housings, one of said guide frames having vertically spaced openings adapted to admit said screws, respectively, into bearing engagement with the roll chocks carried by said one of said guide frames.

10. The apparatus defined by claim 1 characterized by a pair of exit guide holders mounted one on each guide frame.

11. The apparatus defined by claim 1 characterized by the upper chock of each pair having lifting loops pivoted on opposite sides thereof.

12. In a rolling mill, a pair of mill housings disposed side-by-side in spaced relation having windows therein, a pair of roll chocks positioned in the window of each housing, a pair of spaced roll-chock guide frames extending through the window of one housing and into the window of the other housing, one chock of each pair being slidable on each of said guide frames for movement into and out of the housing windows and a roll journaled in the chocks carried by each guide frame.

13. The apparatus defined by claim 12 characterized by each guide frame having an angularly disposed portion at its inner end and a bearing in each such portion having a roll-driving member journaled therein.

14. The apparatus defined by claim 12 characterized by screws for adjusting the chocks of one roll, abutments on said housings adapted to be engaged by the chocks of the other roll to position them for normal operation, stop means on the housings adapted to be engaged by the guide frame of said other roll on inward movement thereof to position said other roll and its chocks for roll-changing and reversible power means for urging the guide frame of said other roll inwardly and outwardly.

15. The apparatus defined by claim 14 characterized by stop means for limiting retraction of the guide frame of said one roll on backing off of said screws.

WILLIAM J. HILL.
CHARLES CLARKE WALES.

REFERENCES CITED

The following references are of record in the file of this patent:

UNITED STATES PATENTS

| Number | Name | Date |
|---|---|---|
| 1,891,579 | Schreck | Dec. 20, 1932 |

FOREIGN PATENTS

| Number | Country | Date |
|---|---|---|
| 626,548 | Great Britain | July 18, 1949 |
| 627,129 | Great Britain | July 29, 1949 |